United States Patent
Semak

(10) Patent No.: US 6,813,533 B1
(45) Date of Patent: Nov. 2, 2004

(54) METHOD FOR SIMULATION OF LASER MATERIAL DEPOSITION

(76) Inventor: Vladimir V. Semak, P.O. Box 11, Pine Grove Mills, PA (US) 16868

(*) Notice: Subject to any disclaimer, the term of this patent is extended or adjusted under 35 U.S.C. 154(b) by 0 days.

(21) Appl. No.: 10/146,012

(22) Filed: May 14, 2002

Related U.S. Application Data

(60) Provisional application No. 60/291,182, filed on May 15, 2001.

(51) Int. Cl.[7] ............................................. G06F 19/00
(52) U.S. Cl. .................... 700/118; 700/166; 219/121.6; 219/121.61; 148/97
(58) Field of Search ................................ 700/118, 166; 219/121.63, 121.6, 121.64, 121.65, 121.66; 148/97, 224, 525, 565, 903; 156/272.8; 264/1.37, 400, 409, 497, 482; 29/888.043

(56) References Cited

U.S. PATENT DOCUMENTS

| | | | |
|---|---|---|---|
| 6,046,426 A | * | 4/2000 | Jeantette et al. ........ 219/121.63 |
| 2003/0010409 A1 | * | 1/2003 | Kunze et al. ................ 148/513 |
| 2003/0127436 A1 | * | 7/2003 | Darrah et al. .......... 219/121.66 |

OTHER PUBLICATIONS

Chande T., Mazumder, J., A Two–Dimensional Model for Mass Transport in Laser Surface Alloying, *Proc. ICALEO'84*, v. 44, pp. 140–150, 1985.*

Chan C., Mazumder J., Chen M.M., Three–Dimensional Model for Convection in Laser Melted Pool, *Proc. ICALEO'84*, v. 44, pp. 17–27, 1985.*

Whitney E., ARL Pennsylvania State University, private communication.*

Chande T., Mazumder J., A two–dimensional model for mass trnasport in laser surface alloying, Proc. ICALEO'84, v. 44, pp140–150, 1985, LIA Orlando FL.

Chan C., Mazumder J., Chen M.M., Three dimensional model for convection in laser melt pool, Proc. ICALEO'84, v. 44, pp. 17–27, 1985, LIA Orlando FL.

* cited by examiner

*Primary Examiner*—Albert W. Paladini
*Assistant Examiner*—Charles Kasenge

(57) ABSTRACT

A method for simulation of laser free form fabrication of parts and laser cladding with metal powder or wire includes absorption of laser beam at the surface exposed to metal powder particle jet, enthalpy influx into the part surface due to powder injection, 3D transient conductive heat transfer in the part, material loss due to evaporation, 3D melt pool surface shape determined by surface tension and gravity, 3D shape of the melt pool bottom, interaction of laser beam with the metal powder jet (heating of powder particles and attenuation of laser beam in powder cloud), and shape of part build up due to addition of metal material.

2 Claims, 1 Drawing Sheet

METHOD FOR SIMULATION OF LASER MATERIAL DEPOSITION

Figure 1:
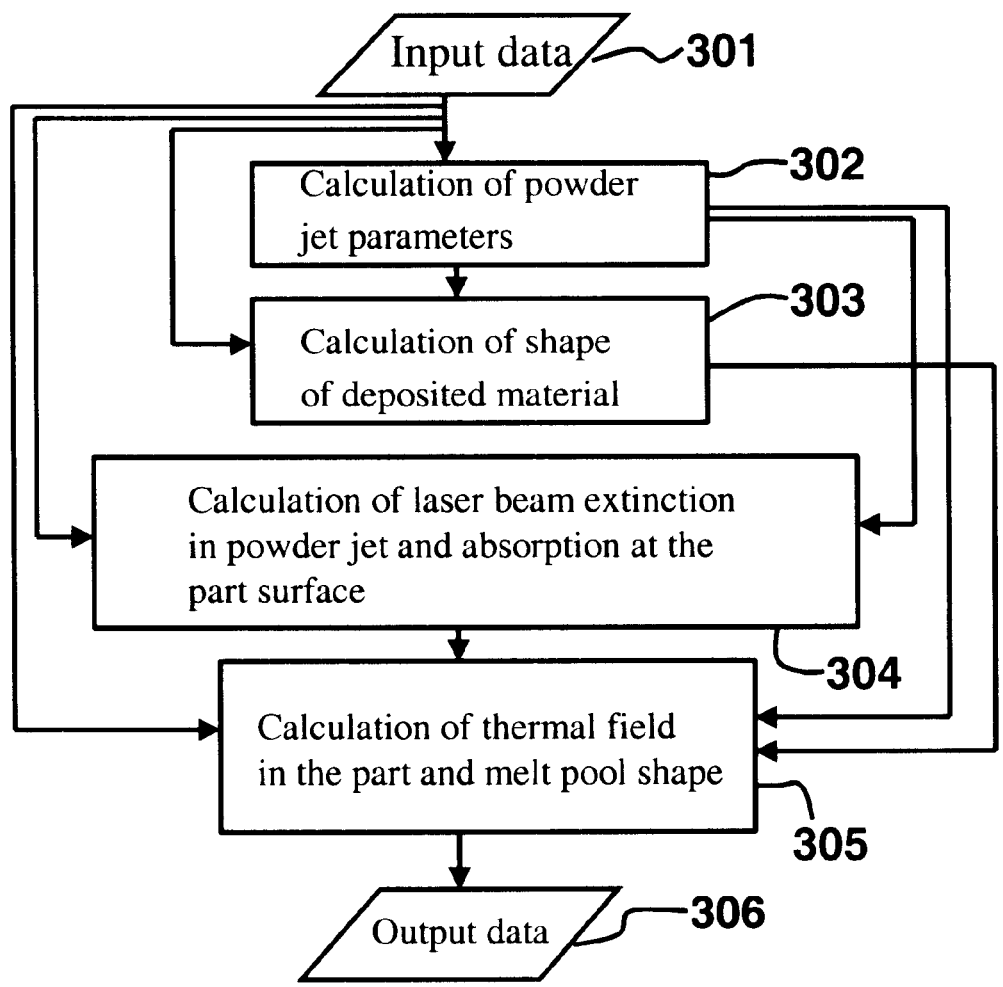

This application claims to benefit of provisional application No. 60/291,182, filed May 15, 2001.

BACKGROUND

1. Field of Invention

This invention belongs to the filed of methods of computer simulation based control of laser deposition of material on a similar or dissimilar substrate via delivery into the high energy beam (laser, electron-beam, etc.) in the form of powder or wire, melting in the beam and fusing the molten deposit to the substrate.

1. Prior Art

Material deposition utilizing a focused energy beam (e-beam or laser) is a rapidly emerging technology, which allows manufacturing of near-net to net-shaped structural metal parts, improvement of the performance by modification of part surface, and repair of damaged part. This technology supplements traditional technologies (casting, molding, sintering, etc.) providing additional benefits such as very low or no porosity, higher uniformity of material composition and microstructure, higher flexibility (low retooling time), and higher portability of hardware. Additionally, high energy beam assisted material deposition allows manufacturing of functionally graded materials and complex geometries, which are impossible to produce by other technologies. Because of this great potential, high energy beam material deposition is a crucial technology for many industries including aero-space, transportation, and metal fabrication.

Initially, laser and e-beam cladding, a simplest type of high energy beam assisted material deposition, was commercialized and implemented. Laser and e-beam cladding technology is utilized to repair rails (Duroc AB, Sweden), repair turbine blades (Huffman Corporation, USA), improve surface of automobile parts (Caterpillar, USA), and in many other applications.

The major implementation problem was to select processing parameters producing deposition without defect known as "lack of fusion", i.e. incomplete melting of the deposited material and joining to the substrate. In order to facilitate the selection of the process parameters providing free of lack of fusion cladding several computer models [1,2] were developed. The utilization of these models to facilitate cladding process development in GE Aircraft Engines proved to be unsuccessful [3]. The models [1,2] were based on approximate and incorrect physical concepts providing accuracy of prediction insufficient for practical needs. Therefore, the laser and electron beam cladding process parameters selection is performed empirically via trial and error method. The specifics of cladding are such that this technology is feasible for commercialization, although empirical selection of the processing conditions increases cost of the technology.

Multiple attempts to commercialize another type of high energy beam assisted material deposition, called free forming or near net shaping, demonstrated that industrial implementation is unfeasible without utilization of process modeling. This is determined by several factors. First, unlike in case of cladding, in free forming the geometry of the substrate is constantly changing. Therefore, in order to empirically select processing parameters providing deposition without lack of fusion defect, the experiments must be performed on the substrates with geometry reproducing the real part. Experience shows that the cost of such development work makes application of the technology unfeasible. Second, in majority of applications of free forming, such as aerospace industry, the microstructure of the deposited part is important. The microstructure is determined by the thermal history of the part. The experience shows that it is impractical to search for the parameters providing desired microstructure via empirical trial and error method. Third, in case of deposition of multiple materials in order to create graded chemical composition in the manufactured part, the evaporation can significantly influence the chemical composition of deposit, such that it will differ from the simple algebraic sum of the component materials supplied in the beam by powder or wire. The empirical way of determining the processing parameters, which provide desired change of chemical composition of the deposit is impractical.

OBJECTS AND ADVANTAGES

The presented invention provides a means allowing control of high energy beam assisted material deposition based on the computer simulation of the process. The process control via numerical simulation is obtained by:

1) defining the processing parameters resulting in the optimal shape of molten zone allowing complete fusion of the deposited material to the substrate,
2) predicting shape of the deposit (shape of the cross section or height and width) which allows planning of the deposition path by CAD software
3) predicting the contour of the melt puddle edge and the surface temperature distribution at any stage of the fabrication, such allowing intelligent implementation of multiple monitoring techniques suggested for the material deposition.

SUMMARY

This invention includes the method for simulation of laser processing regimes in which material is deposited on the surface in form of fused layer. The method includes utilization of the unique physical model representing all main physical processes taking place during laser assisted material deposition, corresponding mathematical model consisting of equations describing the relevant physical processes, and a computer code used for numerical calculations of the parameters of interest according to the mathematical model.

DRAWINGS

FIG. 1. Flow chart of the simulation of laser material deposition.

DETAILED DESCRIPTION

The preferred embodiment of the invention is in integration of the computer system containing the software for numerical simulation of the deposition process with the computer containing Computer Aided Design (CAD) model of the part and with the sensors system for monitoring and feedback regulation of the manufacturing process. In such embodiment the CAD model will generate the tool path based on the results computed by the process simulation software and the feedback manufacturing regulator will maintain the process parameters in the range providing the computed result.

The process of simulation based control of part manufacturing includes the following:
entering the numerical data representing geometry (CAD model) of the part to be fabricated or repaired;
entering the thermal properties of the deposited material or materials, the thermal properties of the alloy of these materials, and distribution of the sizes of the powders of the deposited materials or diameters of wires of deposited materials;

computing the shapes of the deposit and shapes of the molten pool for different locations of the beam and different processing parameters (beam power, beam translation speed, beam size, materials deposition rates, etc.)

selecting processing-parameters, which provide complete fusion of the deposited material to the substrate;

entering into the CAD model the cross sections of the deposit in one pass for the different locations within the part boundary corresponding to the selected processing parameters;

computing the tool path by CAD software for each layer of thickness predicted by simulation software;

monitoring the process of deposition and adjusting the processing parameters utilizing the feedback regulator in order to maintain the surface temperature and melt puddle contour as predicted by the numerical simulation software.

The invention comprises the method for simulation design and visualization of the process of laser assisted material deposition. The stages of simulation are shown as a flow chart in FIG. 1. The first stage (301 in FIG. 1) is the input of data the processing parameters. The second stage (302 in FIG. 1) is the calculation of powder jet parameters. These include particle number density, particle temperature, particle radii, and distribution function of particle size. The third stage (303 in FIG. 1) is calculation of the shape of deposited material. The input data entered and the calculated powder jet parameters are used in the calculations in the third stage. The fourth stage (304 in FIG. 1) is calculation of the laser beam extinction in the powder jet and absorption of the transmitted beam at the part surface. In this stage input data and computed powder jet parameters are utilized. The fifth stage (305 in FIG. 1) is calculation of the thermal field in the part and shape of the melt pool bottom. In this stage the input data and results of computations performed in all previous stages are utilized. The sixth stage (306 in FIG. 1) is the output of the calculation results. The calculations in the stages indicated as 302–305 are performed predefined number of times and the calculation results are output at the defined moments to simulate temporal evolution of the process.

In the first stage shown as 301 in FIG. 1 the values of input parameters are specified. The input parameters required for the computations are:

1) Laser intensity distribution-variable in time I(x,y,t). This data-should be measured for modeled laser system. In the simplest case of uniform beam it is enough to know laser power P(t) and laser beam radius $r_1$, then $I(x,y,t) = I(t) = P(t)/\pi r_1^2$.

2) Velocity of beam (or part) translation u.

3) Thermo-physical properties of substrate and (if different) of each powder material: c-specific heat, ρ-density, heat conductivity k (or heat diffusivity a), melting temperature $T_m$, $L_m$—latent heat of melting, $L_v$—latent heat of evaporation, M—atomic mass, and surface tension of molten material σ.

4) Mass deposition rate ṁ (can be time dependent).

5) Parameters for each powder jet (if the number of jets more than one): jet radius $r_j$, jet inclination angle α, jet velocity v.

6) Distribution function of particle size $f(r_p)$, in simplest case just particle size (or average particle size)—$r_p$.

7) Initial temperature of the substrate T0.

8) Absorptivity of metal surface and particle surface for a given laser wavelength.

9) Calculation time step, dt, and number of calculation steps N, which defines moment of time T=N*dt when output of calculations is printed.

In the second stage shown as 302 in FIG. 1 the powder jet parameters are calculated. First the particle number density is calculated using the equation $$N = \frac{\dot{m}}{\rho_p u s_j \int_0^\infty V_p f(r_p) dr_p}$$

where ṁ is the mass flow rate, $\rho_p$ is the particle material density, $s_j$ is the powder jet cross section, $V_p$ is the particle volume, $f(r_p)$ is the particle size distribution function, and u is the jet velocity. Then particle temperature, $T_p$, radius, $r_p$, and distribution function, $f(r_p)$, are calculated for different locations of the powder jet and different moments of time using the system of equations $$\begin{cases} \dfrac{\partial T_p}{\partial t_p} = \dfrac{A_p I_p S_p}{c_p \rho_p V_p} - q_{ev} S_p \\ \dfrac{dV_p}{dt} = \mu_{ev} S_p \\ I_p = I_0 \exp\left(-\int_0^{h_x} \gamma dh_x\right) \\ \int_0^\infty f^*(r_p) dr_p = \int_0^\infty V_p f(r_p) dr_p \end{cases}$$

with the initial conditions $T_p(t=0) = T_0$ $V_p(t=0) = V_0$

Here $A_p$ is the particle surface absorptivity, $c_p$ is specific heat for particle material, $\mu_{ev}$ is the evaporation rate, $s_p$ is the optical absorption cross section for a particle, $S_p$ is the particle surface area, γ is the extinction coefficient for laser beam in the particle jet, $I_0$ is the laser beam intensity, $f(r_p)$ is the particle size distribution function before the entering the laser beam, and $f^*(r_p)$ is the particle size distribution function in the laser beam taking into account-particle evaporation.

In the third stage shown as 303 in FIG. 1 the calculation of the shape of the surface of deposited material is performed according to the equations giving thickness of deposited layer without including evaporation, d(x,y), and with evaporation, $d_r(x,y)$, of particles in the laser beam $$d(x, y) = F\left(\frac{\dot{m} \cos(\alpha)}{S_j}, \sigma, t\right)$$

$$d_r(x, y) = F\left(\frac{\dot{m}^* \cos(\alpha)}{S_j}, \sigma, t\right)$$

where α is the inclination angle of a powder jet, σ is the surface tension of molten material, ṁ* is the deposition rate including evaporation of the particles in the laser beam. The function F is a function determined by the surface tension and gravitational forces for a specific geometry of the melt pool and amount of deposited material. The ways of determining this function are described in textbooks on surface tension. In simplest case the shape of the melt is spherical.

In the fourth stage shown as 304 in FIG. 1 the laser beam extinction in the powder jet and absorption of the beam at the part surface are calculated. The extinction of the beam is given by the exponent term in the equation $$I_{abs} = AI_0 \exp\left(-\int_0^{h_x|_{z=d_r(x,y)}} \gamma dh_x\right)$$

The surface absorptivity A is calculated using equation $$A = f\left(\frac{\dot{m}^*\cos(\alpha)}{S_j}, u_b\right)$$

where $u_b$ is the beam translation velocity.

The function f can be determined empirically or theoretically. Experience and theoretical considerations show that in case of large size beams the equation for calculation of surface absorptivity is $$A = A_0 + K\frac{\dot{m}^*\cos(\alpha)}{S_j u_b}$$

where $A_0$ is the part's surface absorptivity without powder jet, K is a coefficient dependent on type of deposited material named Kelly's coefficient.

In the fifth stage shown as 305 in FIG. 1 the thermal field induced in the part is performed using equation $$c\rho\frac{\partial T}{\partial t} = \nabla T$$

with the boundary condition $$\text{grad}T|_{z=d,(x,y)} = I_{abs} - q_{ev} + q_{dep},$$

where $I_{abs}$ is absorbed laser intensity, $q_{ev}$ is heat loss due to evaporation, $q_{dep}$ is heat input (or loss) due to deposition of material, and the initial condition $$T(x,y,z,t=0) = T_0$$

In the sixth stage shown as 306 in FIG. 1 the results of calculation are output. The output results include:

1) time dependent temperature field in the part, $T(x,y,z,t)$,
2) thickness of deposited material (z-coordinate), $h(x,y,t)$,
3) melt front depth (z-coordinate), $h_m(x,y,t)$,
4) distribution of laser intensity absorbed at the surface after beam attenuation in the powder jet, $I_{abs}(x,y,t)$,
5) temperature of particles in the jet $T_p(x,y,z,t)$, particle size distribution function at the part surface modified due to particle evaporation $f^*(r_p)$, or, if used just average particle size, size of particles at the surface changed due to evaporation.

What is claimed is:

1. A method of using a computer processor to perform simulation of the laser beam material deposition in which said computer processor executes computations according to an algorithm comprising the steps of:
   a) entering numerical data representing geometry of the part to be fabricated or repaired;
   b) entering the thermo-physical properties of the deposited material or materials;
   c) entering the thermo-physical properties of the alloy of the said materials;
   d) entering the distribution of the sizes of the powders of the said deposited materials or diameters of wires of the said deposited materials;
   e) computing the temperature of the said powers particles;
   f) computing the particle size decrease due to evaporation;
   h) computing the extinction of laser beam in the powder jet; and
   i) computing the thermal field and the shape of the molten pool for different locations of the beam on the surface of said deposited material.

2. The method of claim 1 using simulation to predict processing parameters needed to operate a laser free forming system in order to produce material deposition in form of powder or wire onto previously deposited similar or dissimilar material in manner providing a complete fustion fo deposited material to the previously deposited material.

* * * * *